United States Patent [19]
Tilburg

[11] 3,880,705
[45] Apr. 29, 1975

[54] EXPANDING FIBROUS OR PLASTIC MATERIAL BY ADDING PUFFING AGENT UNDER PRESSURE AND SUBSEQUENT PRESSURE RELEASE

[76] Inventor: Jan Van Tilburg, Lyceumstraat 74, Alkmaar, Netherlands

[22] Filed: July 19, 1972

[21] Appl. No.: 273,227

[30] Foreign Application Priority Data
July 20, 1971 Netherlands............ 7134025

[52] U.S. Cl. .............. 162/101; 8/130.1; 26/1; 26/69 R; 28/72 FT; 28/DIG. 1; 100/74; 100/93 RP; 100/151; 131/140 P; 162/157; 162/205; 162/206; 162/305; 264/51; 264/52; 264/53; 426/447; 426/449
[51] Int. Cl......... D06m 1/24; A23l 1/18; A24b 3/18
[58] Field of Search .......... 162/214, 206, 101, 203, 162/205, 206, 207, 317, 318, 210, 214, 290, 376, 157, 305; 99/81, 82; 8/156, 130.1; 100/92, 93 RP, 70, 73, 74, 118, 121, 151; 68/22 A, 22 B; 252/378; 28/72 FT, DIG. 1; 26/1, 69 R; 38/52, 58; 264/51, 53, 55, 52; 260/2.5; 131/140 P; 426/447, 449

[56] References Cited
UNITED STATES PATENTS

| | | | |
|---|---|---|---|
| 3,096,557 | 7/1963 | Messinger.................... | 26/1 |
| 3,335,207 | 8/1967 | Richie..................... | 264/51 X R |
| 3,409,023 | 11/1968 | Zygmunt de la Burde.. | 131/140 P X |
| 3,416,714 | 12/1968 | Skinner...................... | 28/DIG. 1 |
| 3,480,509 | 11/1969 | Stein....................... | 162/314 X R |
| 3,531,371 | 9/1970 | Jordansson et al......... | 162/214 X R |
| 3,656,965 | 4/1972 | Strommer et al............ | 426/449 |

FOREIGN PATENTS OR APPLICATIONS
1,105,239  3/1968  United Kingdom............ 162/206

Primary Examiner—S. Leon Bashore
Assistant Examiner—Richard H. Tushin
Attorney, Agent, or Firm—Lawrence Rosen; E. Janet Berry

[57] ABSTRACT

A process for expanding or puffing fibrous or plastic materials such as paper, tobacco, cotton, asbestos, plastic films, etc., whereby the expandable material in sheet or filament form and a puffing agent are continuously advanced under pressure through a pressure zone defined between a pair of opposed surfaces which continuously separate at the zone outlet so that as the expandable material and puffing agent pass out of the pressure zone the agent expands and puffs the material. Heat is usually applied to the pressure zone to generate or increase the pressure therein. The puffing may be in the form of a liquid, such as water or fluorinated hydrocarbons, or a gas, such as steam. The puffing agent may be supplied separately to the pressure zone or concurrently with the expandable material.

22 Claims, 6 Drawing Figures

EXPANDING FIBROUS OR PLASTIC MATERIAL BY ADDING PUFFING AGENT UNDER PRESSURE AND SUBSEQUENT PRESSURE RELEASE

This invention relates principally to a puffing process and to apparatus for use therein.

The invention provides a continuous process for modifying the properties of an expandable material in which the expandable material is continuously fed between two opposed co-operating surfaces, at least one of which is moving and thereby advancing the material, the advancing material confined between the surfaces being heated under pressure in the presence of a puffing agent therefor, and the surfaces thereafter being contiuously separated so that the pressure is released. The puffing agent may be preheated to supply some or all of the heat required, and where a hot pressurised puffing agent, e.g. pressurised steam, is employed, it can provide both the heat and the pressure for the process with external heating being unnecessary. The modification achieved is due to the expansion of the hot pressurised puffing agent on separation of the surfaces, and is most usually an expansion of the material or article treated, e.g. the bulking of fibrous materials and fabrics.

The invention also provides apparatus for use in the process comprising two opposed co-operating surfaces, at least one of which is movable so that an expandable material fed between the said surfaces can be advanced continuously, and means for heating and/or pressurising such material confined between the surfaces by and/or in the presence of a puffing agent, of a capacity sufficient to expand the material upon continuous separation of the surfaces at the selected machine speed.

The process and apparatus involve the generation of pressure between the co-operating surfaces, so that for most efficient and effective operation it is important to avoid or reduce escape of pressurised puffing agent from between the surfaces laterally of the direction of movement of the material. This may be done, for example, by means of fixed baffles or sealing plates covering the gap between the surfaces on either side, or by means of respective endless sealing belts which fill and/or cover the side gaps between the co-operating surfaces and move with the moving surface or surfaces at least over the pressure heating zone — e.g. endless sealing belts of T-section with the leg of the T sandwiched tightly between the opposed surfaces over the length of the pressure heating zone. It is most preferred however for at least one of the co-operating surfaces to be of or covered with a resilient material, e.g., rubber, and preferably silicone rubber where high temperatures are to be used; the material being treated then tends to become embedded in the resilient surface during passage through the pressure zone, and the resilient surface provides a pressure seal at its edges, provided that the material being treated covers less width than that of the co-operating surfaces. The width of the pressure seals required in any particular operation will of course depend upon the pressure to be used.

In a preferred embodiment the material to be treated is fed between and advanced by a pair of opposed co-operating moving surfaces. In one such embodiment, currently preferred, one of the surfaces is that of a rotatable drum, and the other is that of a flexible, e.g. steel, tension belt which extends for a portion of its run around a portion of the drum circumference to define therewith a pressure heating zone. In one operation, the expandable material and puffing agent are fed between and advanced by the drum and the co-operating run of the belt, and the confined material is heated to generate pressure, the belt being tensioned to maintain it against the drum. Additional pressure may be applied by means of a pressure shoe which urges the belt against the drum, but in many instances this is not necessary.

The confined material may be heated in a variety of ways. Thus dielectric or microwave heating can be employed, especially where very rapid heating is required, but in general conventional heating is adequate and is preferred, the heat being supplied for example via one or both of the co-operating surfaces. Thus in the above belt-drum embodiment the belt and/or the drum can be heated; it is particularly preferred to heat the belt, e.g. by means of radiant electrical heaters mounted adjacent to the belt where it co-operates with the drum.

In the belt-drum embodiment, a layer of resilient material, e.g. rubber, especially silicone rubber, is preferably interposed between the co-operating surfaces. Thus the operative surface of the belt and/or of the drum may have a covering of the resilient material, or a separate endless belt of the resilient material may be employed which extends between the belt and the drum over their co-operating run.

Instead of a co-operating belt and drum, a pair of co-operating belts may be employed in similar fashion to define a pressure heating zone, with pressure shoes being used to urge the belts together.

In an embodiment employing only one moving surface, a rotatable drum co-operates with a stationary pressure shoe having an operative surface of partially cylindrical conformation extending around a portion of the drum circumference. The drum preferably has a coating of rubber or other resilient material. The shoe may be heated, e.g. by means of steam, with the expandable material and puffing agent being fed into the nip between drum and shoe and being advanced by rotation of the drum to emerge with release of pressure where the drum and shoe surfaces separate. An adjustable flap may be mounted at the outlet to control the effective rate of separation of the surfaces and hence the rate at which the pressure is released. In one process and apparatus of this type, hot pressurised fluid, e.g. steam, may be passed through holes or pores in the shoe surface into contact with the expandable material. In this case the shoe surface can for example be of sintered metal or sintered polytetrafluoroethylene. The hot pressurised fluid may be the sole puffing agent employed, providing both the heat and the pressure for the process, though additional puffing agent (the same or different) can, if required, be incorporated in the expandable material as or before it is fed to the pressure heating zone. In these embodiments the drum may be forced, e.g. by means of springs, onto the shoe surface; alternatively, an adjustable free space may be left between the drum and the shoe surface, with the space at the inlet end for example being adjusted to slightly less than that at the outlet. The shoe surface at the outlet end may be rebated slightly away from the drum surface to restrict the rate of pressure release and expansion of the puffing agent. Instead of, or in addition to, the drum having a coating of resilient material, a separate belt of resilient material may be employed in the same manner as described above for the belt/drum embodiment.

The puffing agent may be any one of a variety of different types. It may for example be a liquid solvent or swelling agent for the expandable material, volatilising rapidly from the material on release of pressure at the outlet end of the apparatus, expanding and bulking or otherwise altering the physical structure and characteristics of the expandable material. A non-solvent for the material, for instance water (in most cases) or fluorinated hydrocarbons, absorbed in the material or article being treated can act in similar fashion. Solid blowing or puffing agents can also be used. The puffing agent may be one which is inherently present in the expandable material, e.g. moisture in some materials; it may be added to, admixed with or absorbed in the material before feeding to the pressure heating zone, or it may be fed into the said zone from a separate source, e.g. simultaneously with the material. In the latter instance the puffing agent may be a gas or vapour, e.g. high-pressure steam.

The process and apparatus according to the invention are notable for their flexibility, both as regards the very wide range of materials to which they are applicable and the wide range of effects that can be obtained with any given material. The nature and degree of expansion or other modification of a given material that is obtainable is readily adjusted by control of the temperature, pressure and time of heating in the pressure heating zone, e.g. by controlling machine speed. The rate at which the puffing agent escapes at the end of the pressure heating zone is not only dependent upon the machine speed, but also upon the angle of divergence between the co-operating surfaces where they separate at the end of the zone (more abrupt separation giving more abrupt pressure release and hence more immediate and violent escape of puffing agent), and this may be adjusted, e.g. by means of a flap, to control the effect to be obtained. With sufficiently rapid pressure release and escape of puffing agent, it is possible to fibrillate natural and man-made fibres, filaments, rods, mono-axially oriented plastics films and tapes, etc.; with fibrous sheet materials such as paper and woven or non-woven fabrics, etc. expansion may be effected by separation or bulking of the individual fibres, and additionally by fibrillation of the fibres themselves if an appropriate puffing agent (e.g. a solvent or swelling agent for the fibres) is used and conditions are severe enough.

The range of materials that can be treated is very wide, as is their physical form, e.g. particles, webs, filaments and fibres can all be treated. Thus paper webs may be puffed or expanded, using e.g. water as puffing agent, to give products of increased bulk and absorbency suitable as towels, tissues, etc. Under mild conditions, the paper product may be only slightly or negligibly bulked, but obtain an improved fibre entanglement ("internal expansion") giving increased strength; this is the case with fibrous materials in general. Paper pulp can be treated according to the invention to improve its quality since the process, unlike normal beating, does not decrease the fibre length.

The process and apparatus of the invention are applicable to a whole range of natural and man-made fibrous materials, either in the form of individual fibres or filaments or of non-woven, woven or knitted fabrics. Thus man-made fibres, e.g. nylon, whether made up into a fabric or not, can be expanded to reduce their density. To this end, in a preferred operation, they first are swollen by treatment with a swelling agent (for nylon, e.g. glycol, or 2 percent phenol in water, or 2 percent metacresol in water, etc.) and then treated in the apparatus described before. Each fibre or filament may thereby be fibrillated and transformed into a bundle of very fine more or less interconnected fibres or filaments, i.e., into a yarn-like structure, thus increasing flexibility, absorbency, dyeability, bulk, etc. Cotton, whether made up into a fabric or not, can be expanded to reduce its density and increase its absorbency due to opening up of the fibre structure; the strength of the cotton may thereby be increased due to straightening out of the fibrils, and the consequent increase in flexibility of the fibres can give better crease resistance properties. The cotton bulked in this way has improved dyeability and uptake of resins, while the process imparts paper-making (i.e., felting) qualities to the cotton. For cotton, and in general for natural fibres, water is quite suitable as a puffing agent. Jute is another material which may be treated according to the invention to improve and modify its properties. Jute, either raw or made up into a fabric, may be increased in fineness to such an extent as to render it useful for purposes for which it has not hitherto been suitable. The process may be used in place of conventional initial carding operations, thereby providing the great advantage of preventing shortening of the fibres which occurs with conventional carding. Kenaf, much less expensive than jute, but much coarser, is another natural material which can be improved by the process of the invention. With the apparatus according to FIG. 1 described hereinafter, it has proved to be possible to split kenaf fibres into fibres of the same fineness as real jute (using water as a puffing agent at a pressure of 4 atm. and a temperature of 143° C at the end of the pressure heating zone). Sisal is another fibrous material which may be treated.

Non-woven fabrics of any kind (wet-laid, dry-laid; comprising cellulosic fibres, man-made fibres, asbestos, etc.) can be expanded by the process of the invention to give low-density and/or increased-drape products, and woven or knitted fabrics may be similarly treated to give a bulked product of dense appearance, often without the need for a previous texturising procedure. As indicated generally above, the bulking effect on fabrics of any kind and of any material may be due to fibrillation of the individual fibres or filaments and/or to simple increase in the average fibre to fibre (filament to filament) distance. Whether one obtains one effect or the other, or a combination of both, depends not only on the conditions employed, but also on the nature of the puffing agent. Use of water with man-made fibrous material will normally result in bulking without fibrillation, but fibrillation may occur instead or as well if the puffing agent is a good swelling agent for the man-made material in question.

Grass and like fodder materials may be treated (e.g. using their inherent moisture content as puffing agent), leaving the pressure heating zone in a porous state so that their ultimate drying time is decreased. Synthetic leather, reconstituted leather, synthetic tobacco, and reconstituted tobacco, may all be bulked or expanded by the process and apparatus of the invention.

Rice, corn and the like can be puffed by the method of the invention, using added water or their inherent moisture content as the puffing agent, and vegetables and meat may similarly be tenderised or cooked.

A moving co-operating surface may be patterned, e.g. provided with cavities or dimples, so as to obtain differential effects over the surface of a fabric or web. Such patterned surfaces may also serve for accommodating individual granules, particles or articles, e.g. the rice mentioned above.

The process and apparatus of the invention are also suitable for surface treatment e.g. of plastics films or tapes, coated paper and fabrics. etc.: if a solvent or a swelling agent (or a conventional blowing agent) is applied to the surface of, for example, a coated fabric, before entry into (or while being in) the pressure heating zone, sudden evaporation at the exit side provides the coated fabric with a fibrous or porous surface (breathable or non-breathable, depending on whether the swelling agent or solvent has been applied to the whole coating, or to its surface only); similar treatment of a plastics film or sheet having a solvent or swelling agent applied to one or both faces can give a synthetic paper having a fibrous or foamy surface.

The release of pressure and escape of puffing agent at the exit end of the pressure heating zone is naturally accompanied by a rapid reduction in the temperature of the material treated. This is often of great advantage, since it helps (in most cases no additional cooling is required) to "freeze in" the bulking effect, especially in the case of thermoplastic materials (man-made fibres and fabrics, resin-treated cotton fabrics, resin-treated woollen fabrics. etc.). If such materials are not cooled after expansion, relaxation to a less bulked condition can occur. A resin-treated woven cotton fabric, treated in the apparatus according to FIG. 1) using water as a puffing agent, at a pressure of 3 atm. and at a temperature of 133° C at the end of the pressure heating zone) showed, after treatment, a thickness of 2.15 times its original thickness, while both its length and its width decreased by 5 percent (giving increased stretchability). Relaxation may also be inhibited or prevented, especially but not exclusively for materials without thermoplastic properties (e.g. tobacco, paper), by incorporating an adhesive in the puffing agent; thus where water is employed as puffing agent, as it may be in the production of puffed tobacco and puffed or foamed paper, water-soluble polymers are suitably incorporated in the water as adhesives. Such use of an adhesive can be helpful in inhibiting relaxation of fibrillated thermoplastics materials.

In cases where one wants to increase the absorption of puffing agent into the material to be treated, e.g. where a swelling agent must be introduced into a synthetic material, the material and the puffing agent concerned may be autoclaved in a conventional autoclave in order to achieve the required penetration before the material is fed to the pressure heating zone according to the invention.

It can be of advantage to incorporate a surface active agent (e.g. soap, foaming or non-foaming synthetic detergent, etc.) in a liquid puffing agent to obtain increased penetration and expansion, especially in the case of tobacco, paper and non-wovens.

The process according to the invention may be performed on materials already expanded by conventional processes. One may, for example, apply the process according to the invention to conventional closed-cell foamed sheets (e.g. polyethylene or polypropylene foam) in order to open such sheets entirely or just as far as their surface(s) are concerned. In this case no additional puffing agent is required.

By the process according to the invention it has (with the aid of the apparatus according to FIG. 1, with water as a puffing agent and at a pressure of 3 atm. and a temperature of 133° C at the end of the pressure heating zone) proved to be possible to increase the bulk of tobacco by as much as 200 percent; bulked tobacco, as a matter of course, produces less tar and nicotine per unit of volume than conventional tobacco; the process may also be applied to tobacco in one of its early stages, e.g. before fermentation, considerably reducing the fermentation time.

Preferred embodiments of the process and apparatus according to the invention will now be described, by way of example only, with reference to the accompanying drawings, in which.

Figure 1:
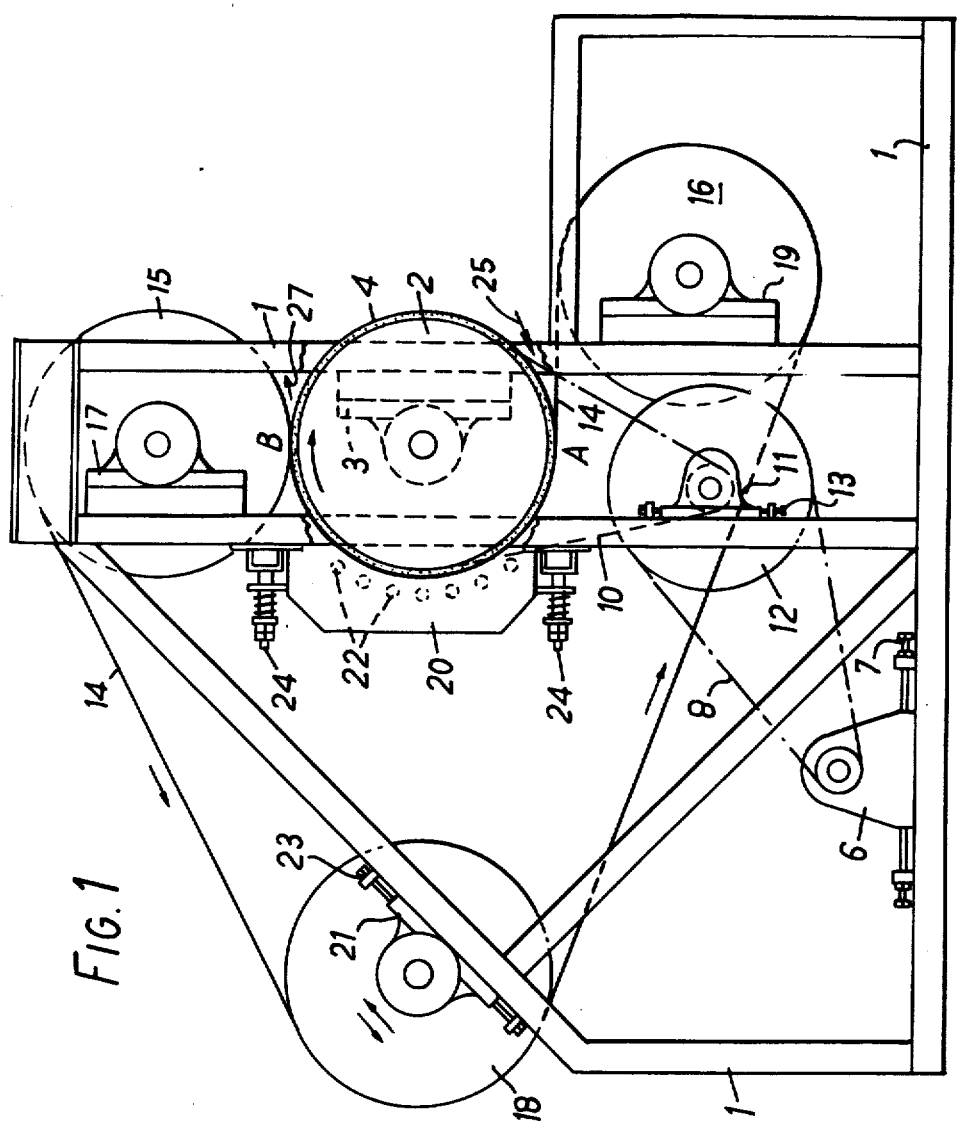
FIG. 1 is a sectional view, with parts broken away, of a working apparatus according to the invention employing a drum and a belt to provide the co-operating surfaces.

Referring to FIG. 1 of the accompanying drawings, the apparatus shown has a steel frame 1 and includes a rotatable drum 2 mounted on bearing block 3 on frame 1, and having around its cylindrical surface a covering 4 of silicone rubber. In operation, drum 2 is driven for rotation in the direction indicated by the arrow by motor 6 via chain or belt drives 8, 10 and wheel 12; motor 6 is mounted on frame 1 for horizontal adjustment by means of lead screw 7, and wheel 12 is mounted on bearing block 11 which is affixed to frame 1 for vertical adjustment by means of lead screw 13. An endless flexible steel belt 14 is guided around fixed rotatable rollers 15, 16 and adjustable rotatable roller 18, passed round and in contact with the covered surface of drum 2 between the points A and B; rollers 15, 16 and 18 are mounted on frame 1 by way of respective bearing blocks 17, 19 and 21. In operation, the steel belt is continuously advanced in the direction indicated by the arrows by rotation of the drum 2. The bearing block 21 for guide roller 18 is adjustable, by means of lead screw 23, in the direction indicated by the double arrow to permit the belt 14 to be tensioned and held tightly against the covered surface of drum 2. A heater casing 20 housing electric spiral radiant heaters 22 is mounted against and in sliding contact with the fact of belt 14 remote from drum 2 where the belt co-operates with the drum 2. Heater casing 20 is maintained against the belt by spring mountings 24 on frame 1.

In operation, the expandable material and puffing agent are fed continuously between the drum 2 and belt 14 at point A (as indicated by arrow 25), and are conveyed continuously between the belt and drum to point B from where the treated material is continuously collected as it emerges (as indicated by arrow 27). Heat supplied to the confined material via belt 14 from heaters 22 activates the puffing agent so that as they approach point B the material and puffing agent are at elevated temperature and pressure; as the material emerges from between the separating drum and belt at point B, the pressure is rapidly released with consequent expansion of the puffing agent and cooling of the material. The pressure is maintained within the pressure heating zone between points A and B by the pressure seal provided between the silicone rubber covering 4 and the belt which is maintained tightly tensioned against the drum 2.

In the particular apparatus shown to scale in FIG. 1, the drum 2 and each of the rollers 16, 18 and 15 are twenty inches in diameter, and the width of the steel belt and silicone rubber covering on the drum is 12 inches. The maximum heating capacity of the variable-capacity heater heater 20 is 5 kilowatts, and the apparatus is designed to operate at a pressure of up to 20 atm. and at a temperature of up to 200° C in the pressure heating zone. These figures are by no means limiting; for example, the width of the steel belt and co-operating rubber-covered drum may be as large as required.

Figure 2:
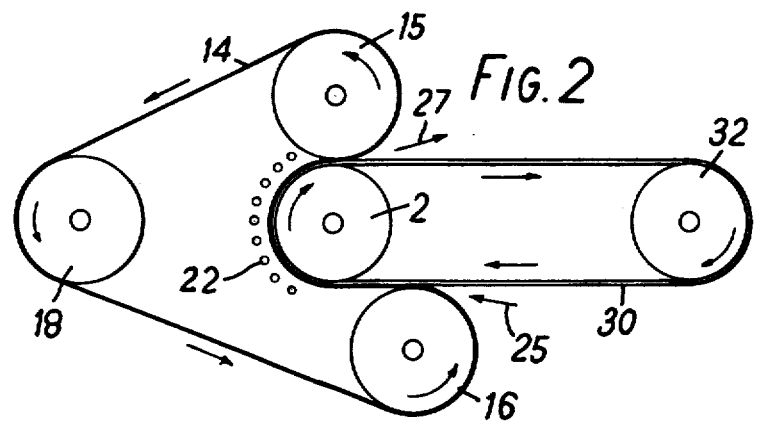
FIGS. 2 to 5 are sectional views illustrating diagrammatically respective modified embodiments.

FIG. 2 illustrates diagrammatically a modification of the FIG. 1 embodiment, in which the silicone rubber covering on drum 2 is replaced by a separate silicone rubber belt 30 which passes around drum 2 and roller 32, and is driven by rotation of the driven drum. In FIG. 2, parts corresponding to those in FIG. 1 are accorded the same reference numerals as in FIG. 1, and the parts not shown are the same as those of FIG. 1. In the FIG. 2 embodiment, the expandable material and puffing agent are fed in between the belt 30 and the steel belt 14 where they meet at the top of roller 16 (as indicated by arrow 25) and emerge where indicated by arrow 27.

The FIG. 2 embodiment can be regarded as a modification of FIG. 1, or as an embodiment in which the co-operating surfaces are those of the two belts 14 and 30.

Figure 3:
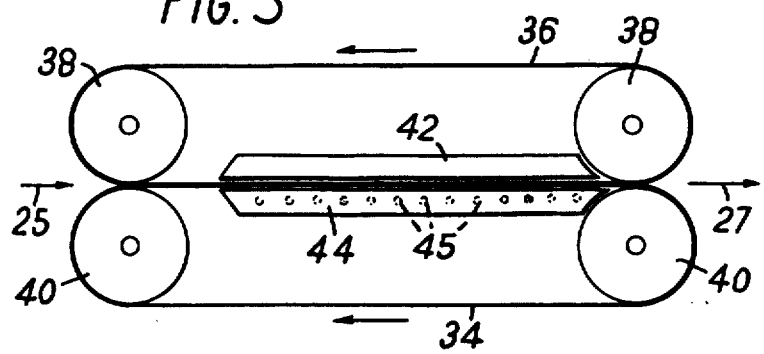

FIG. 3 illustrates diagrammatically another embodiment in which the co-operating surfaces are those of two endless moving belts 34 and 36 guided in the directions shown by the arrows around rollers 38 and 40. Preferably at least one of the rollers 38 and at least one of the rollers 40 is driven in conventional manner. In this case the belts co-operate over a planar run to define the pressure heating zone where they are urged together by pressure shoes 42 and 44, one or both of which may be heated, e.g. by radiant heating elements as for belt 14 in FIG. 1; FIG. 3 shows shoe 44 heated internally by electric heating elements 45. As indicated by arrows 25 and 27, the expandable material and puffing agent are fed in between rollers 38 and 40 at the left-hand side of the apparatus, and exit, with release of the pressure generated, from between the rollers 38 and 40 at the right-hand side of the apparatus. At least one of the belts is preferably of resilient material such as silicone rubber to provide a seal preventing lateral escape of pressurised puffing agent from the pressure heating zone defined between the two pressure shoes.

Figures 4, 5:
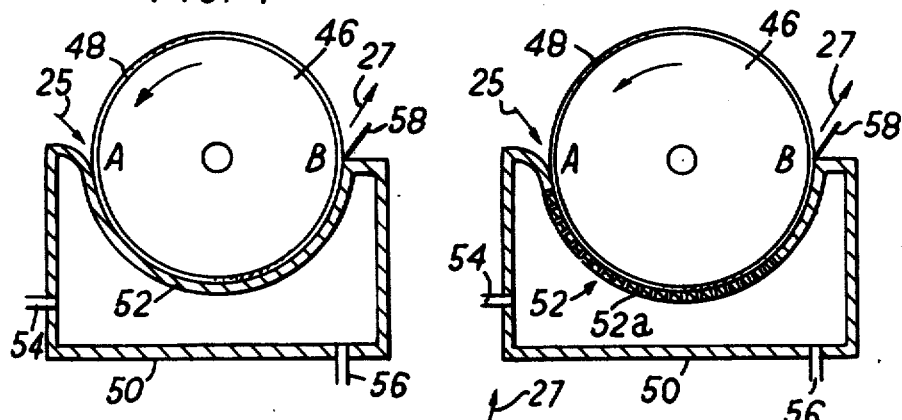

FIG. 4 illustrates an embodiment which employs only a single moving surface in the pressure heating zone. The apparatus includes a drum 46 driven in conventional manner for rotation in the direction indicated by the arrow and having its cylindrical surface covered with a coating 48 of resilient material such as silicone rubber. A stationary hollow shoe 50 is mounted below the drum, and has a partially cylindrical concave upper surface 52 complementary to and closely spaced from the lower portion of the drum circumference. Portion 52 of shoe 50 preferably has a coating of non-stick material such as polytetrafluoroethylene on its outer face opposed to the drum. The shoe is heated, e.g. by high pressure steam, passing therethrough via inlet and outlet pipes 54 and 56. in operation, the expandable material and puffing agent are fed between the rotating drum and shoe at point A as indicated by arrow 25, and are conveyed by rotation of the drum to point B where the material emerges on separation of the drum and shoe surface as indicated by arrow 27. The rate of pressure release, and hence of expansion of the puffing agent, may be controlled at some extent by means of a flap 58 which can be pivoted towards or away from the drum so as to decrease or increase the effective rate of separation between the opposed drum and shoe surfaces. The drum may be resiliently pressed towards the co-operating shoe surface by spring mountings, or it may be adjustably mounted to provide a controllable free space between the co-operating surfaces. As with the FIG. 1 embodiment, the rubber coating on the drum may be replaced by a separate endless rubber belt.

A similar embodiment is diagrammatically illustrated in FIG. 5, in which corresponding reference numerals are employed for corresponding parts. In the FIG. 5 embodiment, a part 52a of the co-operating portion 52 of shoe 50 is perforate or of porous material, so that the steam or other hot pressurised fluid passes through this portion into direct contact with the material confined in the pressure heating zone. In this case the pressurised heating fluid may serve as the puffing agent, though it is still possible to incorporate puffing agent in the expandable material before it is fed to the machine. When supplying puffing agent at two stages, that for the first stage does not have to be the same one as that for the second stage; one may, for instance, incorporate a low-boiling hydrocarbon in the material before it is fed to the machine, and supply high-pressure steam through portion 52a. The pressurised heating fluid supplied through portion 52a acts as a lubricant to assist ready passage of the expandable material through the pressure heating zone. The portion 52a in this embodiment is suitably of sintered metal or sintered polytetrafluoroethylene. In the embodiments of both FIGS. 4 and 5, sealing plates may be mounted against the ends of the drum and shoe to assist in preventing lateral escape of puffing agent from the pressure heating zone.

Figure 6:
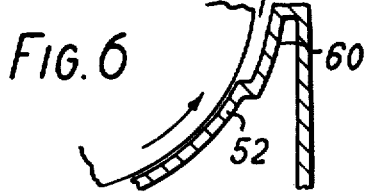
FIG. 6 is a diagrammatic sectional view of part of an apparatus of the type illustrated in FIG. 4 or FIG. 5 showing an optional feature which may be employed.

FIG. 6 illustrates diagrammatically a modification at the outlet end of the shoe which may be employed in the FIGS. 4 and 5 embodiments. Here the extreme end 60 of portion 52 of the shoe is rebated slightly away from the surface of the drum to restrict the expansion of the puffing agent and hence of the expandable material. In the FIG. 6 embodiment, the adjustable flap 58 optionally present in the FIGS. 4 and 5 embodiments will normally be omitted.

In a modified method of operating the apparatus of FIG. 5, unheated or partially heated puffing agent is supplied to the expandable material through the porous or perforate portion 52a, the additional heating required being supplied from another source, e.g. by internal heating of the drum.

In a modification of the process according to the invention, for use with an expandable material (e.g. natural fibres such as cotton, jute, kenaf) which is a good absorber of gas under pressure (e.g. pressurised $CO_2$, air, etc.), heating is not employed. The gas, employed as puffing agent, is supplied and maintained under pressure between the co-operating surfaces, and expands the material on release of pressure where the surfaces separate. The apparatus of FIG. 5 can be employed in this way, the pressurised gaseous puffing agent being supplied through the porous or perforate portion 52a. This procedure is unsuitable when the end product has to be heat set.

In most instances of the operation of processes according to the invention, the puffing agent escapes from the treated material on the release of pressure, but this need not always be the case. For example, a foamed thermoplastic sheet in which the puffing agent is retained may be formed by feeding a thermoplastic sheet into the apparatus of FIG. 5, with high pressure gas being supplied as puffing agent via the porous or perforate portion 52a and the temperature within the pressure heating zone being maintained near the melting point of the thermoplastics material. In this embodiment it is necessary to cool the foamed sheet issuing from the apparatus outlet.

It will be evident that the embodiments shown in FIGS. 1 to 6 can be operated in orientations other than those illustrated.

I claim:

1. A process for expanding a fibrous or filamentary material comprising the steps of continuously feeding said material between a first surface and a second surface disposed in opposed co-operating relationship with said first surface and defining therewith a pressure zone, continuously advancing at least one of said surfaces whereby said material is continuously advanced through said pressure zone, heating said advancing material in said pressure zone while maintaining said advancing material under the pressure of a pressurized gaseous or vaporous puffing agent continuously introduced into said pressure zone separately from said material, and continuously separating said surfaces whereby said pressure is reduced and said puffing agent expands from said fibrous or filamentary material to expand said material.

2. A process as claimed in claim 1 wherein in said first and second surfaces are endless surfaces which are disposed in opposed co-operating relationship over a portion of their respective runs to define said pressure zone, and wherein said surfaces are advanced in unison to advance said material through said pressure zone.

3. A process as claimed in claim 1 wherein said first surface is the cylindrical surface of a drum and said second surface is a complementary surface of a stationary shoe, said second surface extending around a portion of said cylindrical drum surface in close proximity thereto to define therewith said pressure zone, and wherein said drum is continuously rotated to advance said material through said pressure zone.

4. A process as claimed in claim 3 wherein the puffing agent is supplied through the shoe surface.

5. A process as claimed in claim 3 wherein the puffing agent is a pressurised gas or vapour supplying at least part of the pressure in the pressure zone.

6. A process as claimed in claim 1 including the step of preheating said puffing agent to supply at least a part of the heat for said pressure zone.

7. A process as claimed in claim 1 wherein at least one of said surfaces is of resilient material.

8. A process as claimed in claim 1 wherein said expansion of said puffing agent fibrillates said material.

9. A process as claimed in claim 1 wherein said fibrous or filamentary material is a paper or fabric and wherein said expansion of said puffing agent expands said paper or fabric increasing the fibre-to-fibre or filament-to-filament spacing thereof.

10. A process as claimed in claim 1 wherein said fibrous or filamentary material is selected from tobacco, paper, paper pulp, cotton, jute, kenaf, sisal, thermoplastic fibres and filaments, and woven, non-woven and knitted fabrics.

11. A process as claimed in claim 1 including the step of restricting the degree of expansion of the fibrous or filamentary material where said surfaces separate.

12. A process for expanding a fibrous or filamentary material comprising the steps of continuously feeding said material between a first surface and a second surface disposed in opposed co-operating relationship with said first surface and defining therewith a pressure zone, continuously advancing at least one of said surfaces whereby said material is continuously advanced through said pressure zone, continuously introducing a pressurized gas or vapour into said pressure zone separately from said material, said material absorbing said pressurized gas or vapour, and continuously separating said surfaces whereby said pressure is reduced and said gas or vapour expands from said fibrous or filamentary material to expand said material.

13. A process as claimed in claim 12 including the step of restricting the degree of expansion of the fibrous or filamentary material where said surface separate.

14. A process for fibrillating an oriented plastics material which comprises the steps of continuously feeding said oriented plastics material between a first surface and a second surface disposed in opposed cooperating relationship with the first surface to define therewith a pressure zone, continuously introducing a pressurized gas or vapour into said pressure zone separately from said material, said material absorbing said pressurized gas or vapour, continuously advancing at least one of said surfaces whereby said material is continuously advanced through said pressure zone, and continuously separating said surfaces whereby said pressure is reduced and said gas or vapour expands from said oriented plastics material to fibrillate said material.

15. A process as claimed in claim 14 wherein in said first and second surfaces are endless surfaces which are disposed in opposed co-operating relationship over a portion of their respective runs to define said pressure zone, and wherein said surfaces are advanced in unison to advance said material through said pressure zone.

16. A process as claimed in claim 14 wherein said first surface is the cylindrical surface of a drum and said second surface is a complementary surface of a stationary shoe, said second surface extending around a portion of said cylindrical drum surface in close proximity thereto to define therewith said pressure zone, and wherein said drum is continuously rotated to advance said material through said pressure zone.

17. A process as claimed in claim 16 wherein the pressurized gas or vapour is supplied through the surface of said shoe.

18. A process as claimed in claim 14 wherein at least one of said surface is of resilient material.

19. A process as claimed in claim 14 wherein said oriented plastics material is selected from thermoplastic fibres, filaments, rods and sheets.

20. A process as claimed in claim 14 including the step of supplying heat to said material in said pressure zone.

21. A process as claimed in claim 20 including the step of preheating said pressurized gas or vapour to supply at least a part of the heat for said pressure zone.

22. A process as claimed in claim 14 including the step of restricting the degree of fibrillation of the plastics material where said surfaces separate.

* * * * *